United States Patent
Fishman et al.

[11] Patent Number: 5,930,414
[45] Date of Patent: Jul. 27, 1999

[54] METHOD AND APPARATUS FOR AUTOMATIC COMPENSATION OF FIRST-ORDER POLARIZATION MODE DISPERSION (PMD)

[75] Inventors: Daniel A. Fishman, Lakewood; Fred Ludwig Heismann, Tinton Falls; David L. Wilson, Little Silver, all of N.J.

[73] Assignee: Lucent Technologies Inc., Murray Hill, N.J.

[21] Appl. No.: 08/931,553

[22] Filed: Sep. 16, 1997

[51] Int. Cl.[6] .............................. G02B 6/00; H04J 14/08
[52] U.S. Cl. ............................... 385/11; 385/24; 385/27; 385/28; 385/123; 359/140; 359/156
[58] Field of Search .................................. 385/24, 11, 15, 385/123, 16, 17, 20, 21, 23, 27, 28; 359/140, 156, 153

[56] References Cited

U.S. PATENT DOCUMENTS

| | | | |
|---|---|---|---|
| 5,111,322 | 5/1992 | Bergano et al. | 359/122 |
| 5,212,743 | 5/1993 | Heismann | 368/11 |
| 5,311,346 | 5/1994 | Haas et al. | 359/156 |
| 5,359,678 | 10/1994 | Heismann et al. | 385/1 |
| 5,546,210 | 8/1996 | Chraplyvy et al. | 359/124 |
| 5,557,692 | 9/1996 | Pan et al. | 385/11 |
| 5,587,827 | 12/1996 | Hakimi et al. | 359/249 |
| 5,596,448 | 1/1997 | Onaka et al. | 359/341 |
| 5,710,650 | 1/1998 | Dugan | 359/133 |
| 5,793,511 | 8/1998 | Bulow | 359/161 |
| 5,818,981 | 10/1998 | Pan et al. | 385/11 |
| 5,850,492 | 12/1998 | Morasca et al. | 385/11 |
| 5,859,939 | 1/1999 | Fee et al. | 385/24 |

OTHER PUBLICATIONS

"Polarization Effects on BER Degradation at 10 Gb/s in IM–DD 1520 km optical Amplifier System" by Y. Namihira et al, and published in Electronic Letters, vol. 29, No. 18, p. 1654, 1993.).

"Experimental Equalization of Polarization Dispersion", by M. A. Santoro and J. H. Winters, and published in IEEE Photonic Technology Letters, vol. 2, No. 8, p. 591, 1990.

"Polarization Mode Dispersion Compensation by Phase Diversity Detection", by B.W. Hakki and published in Photonic Technology Letters, vol. 9, No. 1, p. 121, 1997.

"Polarization–Mode–Dispersion Equalization Experiment Using a Variable Equalizing Optical Circuit Controlled by a Pulse–Waveform–Comparison Algorithm", by T. Ozeki et al, and published in the Technical Digest Conference on Optical Fiber Communication 1994 (OSA), p. 62.

"Automatic Compensation Technique for Timewise Fluctuating Polarization Mode Dispersion in In–Line Amplifier Systems", by T. Takahashi et al., and published in Electronic Letters vol. 30, No. 4, p. 348, 1994.

*Primary Examiner*—Brian Healy

[57] ABSTRACT

The effect of polarization mode dispersion that an optical signal experiences as it propagates through an optical transmission fiber is compensated for at a receiver using a birefringent compensator, in which the compensator automatically and adaptively generates a level of differential time delay that substantially equals the differential time delay that the optical signal experiences, but of different sign, and, therefore, essentially cancels out the undesired delay.

41 Claims, 6 Drawing Sheets

METHOD AND APPARATUS FOR AUTOMATIC COMPENSATION OF FIRST-ORDER POLARIZATION MODE DISPERSION (PMD)

FIELD OF THE INVENTION

The invention relates to optical transmission systems and more particularly relates to dealing with so-called polarization mode dispersion in such systems.

BACKGROUND OF THE INVENTION

Polarization Mode Dispersion (PMD) occurs in an optical fiber as a result of a small residual birefringence that is introduced in the fiber core by asymmetric internal stress or strain as well as random polarization coupling due to external forces acting upon the fiber. Consequently, PMD may severely impair the transmission of a signal in an optical fiber network.

It is well-known that PMD affects differently certain polarization components of an optical signal propagating through a optical fiber transmission line, such that differential time delays occur among the components as they travel through the fiber. These differential time delays may range from about 0.1 ps/(km)$^{1/2}$ for low-PMD optical fibers of modern manufacture to several ps/(km)$^{1/2}$ for single-mode optical fibers of older manufacture. Disadvantageously, the differential time delay that may result over a "long-distance" fiber-optic link, for example, a 100 km terrestrial transmission system employing single-mode fiber, due to such differential delays may be more than 20 ps, or more than 10 ps for an transoceanic link employing modern low-PMD optical fiber.

The large time delays that occur between different polarization components of an optical signal may cause significant broadening of the optical pulses propagating through an optical link. This is especially true in modern digital lightwave systems which operate at bit rates of at least 10 Gbps per transmitted-wavelength-channel. In fact, the broadening of a pulse by a different time delay of, e.g., about 20 ps, in a high-bit rate system may cause a partial closure of the "eye diagram" of the received electrical signal by about 0.5 dB, which will significantly distort a received signal.

It is well-known, however, that the differential time delay that might occur in a particular transmission fiber is not constant over time, but may vary over time as the physical environment, e.g., temperature, pressure, etc., of the fiber changes. Thus, the statistics of time-dependent differential time delay caused by PMD in optical fiber usually follows a Maxwellian distribution, and, therefore, at any point in time, may be substantially lower to several times higher than its average (or mean) value.

(Note that in some older high-PMD optical transmission fibers a differential time delay of up to, e.g., 100 ps, is theoretically possible. A time delay of that order may cause, for example, complete fading in the electrical signal, as reported in, for example, the article entitled "Polarization Effects on BER Degradation at 10 Gb/s in IM-DD 1520 km optical Amplifier System" by Y. Namihira et al, and published in Electronic Letters, Vol. 29, No. 18, p. 1654, 1993.)

Prior methods of dealing with signal impairments due to PMD in an optical fiber include, for example; (a) electrical equalization of the signal distortion caused by PMD, as discussed in the article entitled "Experimental Equalization of Polarization Dispersion", by M. A. Santoro and J. H. Winters, and published in IEEE Photonic Technology Letters, Vol. 2, No. 8, p. 591, 1990; and (b) electrical compensation of the differential time delay in the received electrical signals, as discussed in the article entitled "Polarization Mode Dispersion Compensation by Phase Diversity Detection", by B. W. Hakki and published in Photonic Technology Letters, Vol. 9, No. 1, p. 121, 1997. Such prior methods also include (a) optical compensation of the differential time delay before converting the optical signals into electrical signals, as discussed in the article entitled "Polarization-Mode-Dispersion Equalization Experiment Using a Variable Equalizing Optical Circuit Controlled by a Pulse-Waveform-Comparison Algorithm", by T. Ozeki et al, and published in the Technical Digest Conference on Optical Fiber Communication 1994 (OSA), p. 62; and (b) other forms of compensation as discussed in, for example, the article entitled "Automatic Compensation Technique for Timewise Fluctuating Polarization Mode Dispersion in In-Line Amplifier Systems", by T. Takahashi et al., and published in Electronic Letters Vol. 30, No. 4, p. 348, 1994.

Disadvantageously, such electrical equalization schemes can only compensate for a relatively small differential time delay. They also require expensive high-speed electronics. Moreover, prior art optical compensators in general cannot automatically adapt their respective compensation schemes to handle a varying differential time delay in an optical signal traveling in a fiber that is being affected by a fluctuating-random PMD. For example, the optical compensation described in the Takahashi et al. article generates a fixed optical time delay to compensate for the distortion caused by PMD in a transmission fiber. Therefore, such a scheme is limited to dealing with a relatively small range of differential time delays. As another example, although the compensation scheme described in the T. Ozeki et al. article is capable of generating a variable, adaptive differential time delay, it requires expensive high-speed electronics to analyze the shape of received waveforms and derive an error signal that may be used to drive the compensation process toward the desired differential time delay.

SUMMARY OF THE INVENTION

We deal with the foregoing problems and advance the relevant by providing apparatus which automatically adapts to the level of first-order polarization mode dispersion that may be present in an optical signal received from an optical transmission line. Specifically, we use a variable optical birefringence element which, responsive to receipt of the optical signal, generates a differential optical time delay between at least two selectable mutually orthogonal polarization states. An optical signal analyzer coupled to the output of the variable birefringence element, in turn, generates a control signal proportional to the total differential optical time delay that is present in an optical signal appearing at the output of the variable birefringence element. The control signal is supplied to the birefringence element to control the amount of differential time delay that is generated to control which orthogonal polarization states are selected.

In this way, we automatically and adaptively generate a differential time delay that substantially equals the differential time delay that occurs in the transmission optical fiber, but of opposite sign, and, therefore, cancels out the undesired delay.

These and other aspects of our invention are set forth in the following detailed description, corresponding drawings and ensuing claims.

DETAILED DESCRIPTION

Figure 1:
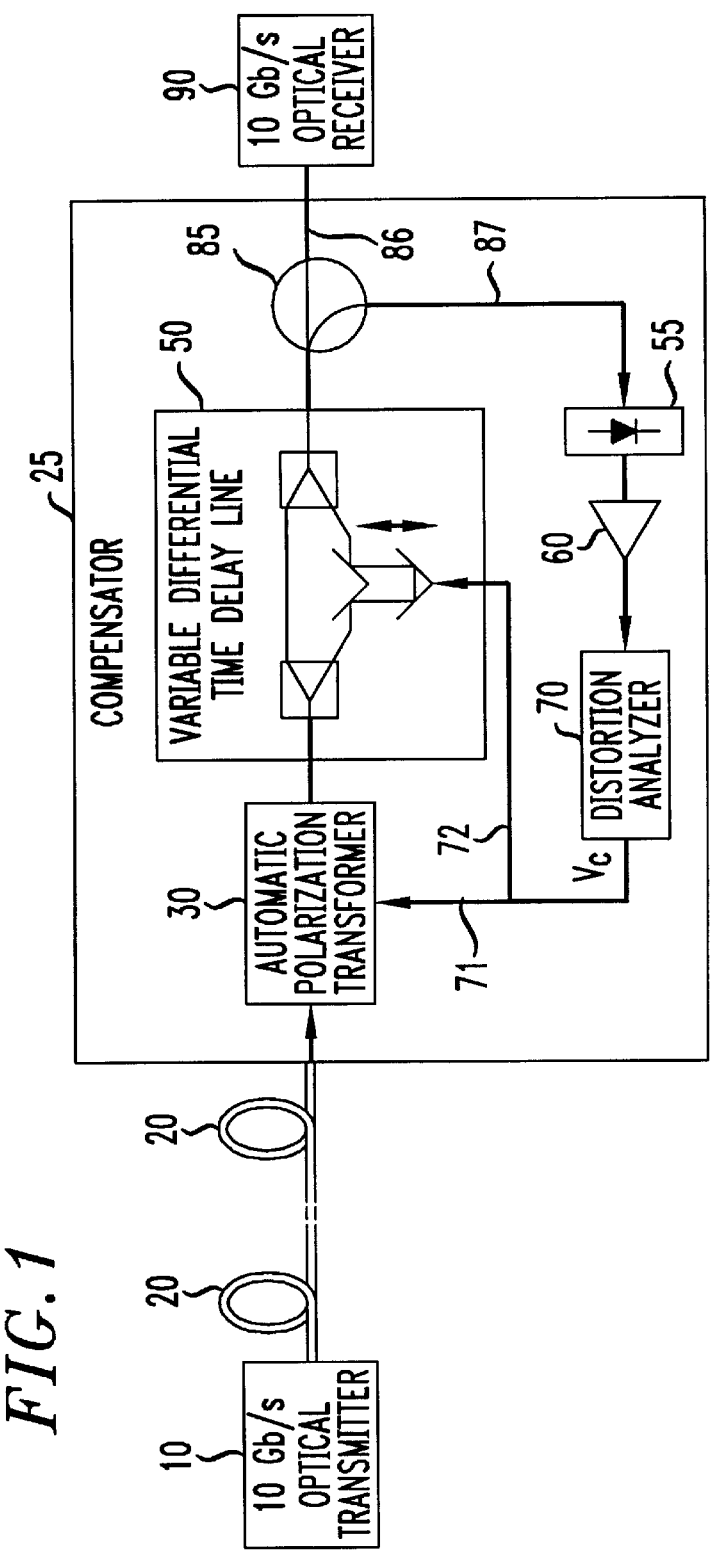
FIG. 1 illustrates in block diagram form an illustrative system in which the principles of the invention may be practiced.

Polarization Mode Dispersion (PMD) occurs in single-mode fibers as a result of residual birefringence in the fiber core and coupling of random polarization at various points along the fiber. The polarization transformation that occurs in the fiber may be modeled using a simple unitary 2×2 Jones matrix, $\underline{U}$, as shown by following expression;

$$\underline{U}(\omega) = \begin{pmatrix} u_1(\omega) & u_2(\omega) \\ -u_2^*(\omega) & u_1^*(\omega) \end{pmatrix} \quad (1)$$

where $u_1$ and $u_2$ in general are complex functions which depend on the frequency, $\omega$, of the optical signal and other physical parameters that influence the mode coupling in the fiber.

It is well-known that for any optical frequency, $\omega=\omega_0$, there exists two orthogonal states of polarization commonly referred to as the Principal States of Polarization (PSP). An optical signal propagating through a fiber does not experience any significant amount of differential time delay if it is polarized at one of the two PSP. Thus, at any optical frequency, $\omega=\omega_0$, the matrix $\underline{U}$ may be "diagonalized" in the following way $$\underline{U}(\omega) = \underline{W}(\omega_0) \cdot \underline{D}(\omega) \cdot \underline{V}(\omega_0)^{-1} \quad (2)$$

where: $\underline{V} = \begin{pmatrix} v_{11} & v_{12} \\ v_{21} & v_{22} \end{pmatrix}$ and $\underline{W} = \begin{pmatrix} w_{11} & w_{12} \\ w_{21} & w_{22} \end{pmatrix}$ (3)

are unitary matrices and;

$$\underline{D}(\omega_0) = \begin{pmatrix} e^{j\phi} & 0 \\ 0 & e^{-j\phi} \end{pmatrix} \text{ is a diagonal matrix.} \quad (4)$$

The Jones vectors;

$$\vec{\psi}_{1in} = \begin{pmatrix} v_{11} \\ v_{21} \end{pmatrix}, \vec{\psi}_{2in} = \begin{pmatrix} v_{12} \\ v_{22} \end{pmatrix} \quad (5)$$

and $$\psi_{1out} = \begin{pmatrix} w_{11} \\ w_{21} \end{pmatrix}, \psi_{2out} = \begin{pmatrix} w_{12} \\ w_{22} \end{pmatrix}$$

correspond to the input and output principal states of polarization, respectively. Also, the frequency dependency in matrix $\underline{D}$ can be approximated to a first order in ($\omega-\omega_0$), at least over a sufficiently small frequency interval $\Delta\omega$ around $\omega_0$, as follows:

$$\underline{D}(\omega) = \underline{D}(\omega_0) \cdot \begin{pmatrix} e^{j(\tau_f/2)(\omega-\omega_0)} & 0 \\ 0 & e^{-j(\tau_f/2)(\omega-\omega_0)} \end{pmatrix} \quad (6)$$

where $\tau_f = 2\sqrt{\left|\frac{d}{d\omega}u_1\right|^2 + \left|\frac{d}{d\omega}u_2\right|^2}$ is the Differential Group Delay (DGD) that causes the aforementioned differential time delay in optical signals that are not launched in one of the two Principal States of Polarization (PSP).

It can thus be appreciated from the above equations that a differential time delay, $\tau_f$, occurs between the two PSP of the fiber. The differential time delay which an optical signal experiences as a result of propagating through an optical fiber may, therefore, be compensated for by introducing an opposite but equal amount of differential time delay, $\tau_c=-\tau_f$, at the output of the fiber, in accordance with an aspect of the invention. This may be readily done using an optical element having the following polarization dependent transfer function:

$$\underline{U}comp = \begin{pmatrix} e^{-j(\omega-\omega_0)\tau_c/2} & 0 \\ 0 & e^{j(\omega-\omega_0)\tau_c/2} \end{pmatrix} \cdot \underline{D}^{-1}(\omega_0) \cdot \underline{W}^{-1}(\omega_0) \quad (7)$$

where $\underline{D}$ and $\underline{W}$ are the matrices shown in equation (3). The matrix $\underline{U}$comp describes first order PMD (i.e., uniform birefringence) at an arbitrary orientation.

As mentioned above, PMD in a fiber may change with changes in time and optical frequency. This change in PMD may be dealt with, in accordance with another aspect of the invention, by varying the amount and orientation of the birefringence in the inventive compensator to adaptively compensate for the DGD in the fiber. An adaptive, variable-birefringence compensator may be readily realized by disposing a polarization transformer 30, for example, the polarization transformer described in U.S. Pat. No. 5,212,743 issued May 18, 1993 to F. Heismann, which is hereby incorporated by reference herein, in series with an element 50 that generates variable linear birefringence (such as, for example, the polarization mode dispersion emulator, model PE3 available from JDS Fitel Inc.), as shown in FIG. 1. Such birefringence may be so generated, in accordance with another aspect of the invention, by splitting the signal at the output of the polarization transformer into two orthogonal linear polarization states corresponding to the two PSP of the fiber, and delaying each of the two polarization states by a variable amount of time, $\tau_c$, using a respective delay line 50 as shown in FIG. 1. In fact, if the polarization transformation that occurs in polarization transformer 30 and the time delay in the variable differential time delay line 50 are properly adjusted such that polarization transformer 30 generates the polarization transformation described by the matrix $W^{-1}$ expressed by equation (7) and such that variable differential time delay line 50 generates the differential time delay $\tau_c$ shown in (7), then a signal outputted by the compensator 25 will be free of the distortions caused by differential time delays occurring in transmission fiber 20.

Note that an optical element (such as, for example, a combination of properly aligned birefringent fibers connected in series) that generates variable frequency dependent birefringence may be used in a similar manner to compensate for signal distortions due to higher-order PMD. However, a polarization transformer in series with a variable birefringence compensator alone would not automatically adapt by itself to changes in the PMD of the fiber. Such automatic adaptation may be achieved, in accord with another aspect of the invention, by providing a feedback signal that controls the polarization transformation occurring in the polarization transformer 30 (i.e., the orientation of the variable birefringence) as well as the differential time delay in the variable differential time delay line 50 (i.e., the amount of linear birefringence). The desired feedback signal may be generated at the output of compensator 25 by monitoring the amount of distortion that is due to the differential time delay present in an optical signal after it has traveled through compensator 25.

We have recognized that, that in accordance with another aspect of the invention, only one feedback signal is needed to simultaneously adjust the polarization transformation and adjust the differential delay, $\tau_c$, to achieve minimal distortion in the signal that compensator 25 outputs to optical receiver 90 via conventional signal tap 85, as is shown in FIG. 1 and as will be discussed below.

Specifically, a portion of the signal that compensator 25 outputs is supplied via optical tap 85 to path 87 extending to high-speed photodetector 55, which may be, for example the Hewlett Packard Co., model 11982 Wideband Lightwave Converter having an electrical bandwidth that is at least equal to the information bandwidth of the modulated optical signal transmitted by optical transmitter 10. The remainder of the signal is supplied to path 86 extending to receiver 90. Photodetector 55 converts the high-speed digital information signal modulated onto an optical carrier signal into an electrical signal. The electrical signal is then amplified by conventional amplifier 60 and coupled to electrical distortion analyzer 70 which measures the distortion in the amplified photocurrent and converts the amplified result into a voltage, $V_f$, that is proportional to the distortion. For example, voltage $V_f$ reaches a maximum value when the optical signal is free of distortion due to first order PMD, i.e., when the combined differential time delay of optical fiber 20 and compensator 25 is substantially equal to zero. The combined DGD, $\tau_{total}$, introduced in fiber 20 and compensator 25 may be expressed as follows:

$$\tau_{total} = \sqrt{\tau_f^2 + \tau_c^2 + 2\tau_f\tau_c\cos(2\theta)} \qquad (8)$$

where $\tau_f$ is the DGD in fiber 20, $\tau_c$ is the DGD in compensator 25 and $2\theta$ is the angle between the so-called Stokes vectors corresponding to the PSP of fiber 20 and PSP of compensator 25, which is controlled directly by polarization transformer 30.

It is apparent from equation (8) that the total differential time delay, $\tau_{total}$, is at a minimum value of $|\tau_f - \tau_c|$ when $2\theta$ is adjusted to a value of $\pm\pi$, i.e., when the so-called slow and fast PSP of fiber 20 are respectively aligned parallel to the so-called fast and slow PSP of compensator 25. Thus, the adjustment of angle $\theta$ may be achieved by adjusting polarization transformer 30 in response to the value of the feedback voltage, $V_f$, supplied via feedback path 71 such that $V_f$ is driven to a relative maximum value.

Also, the differential time delay, $\tau_c$, in compensator 25 may be adjusted in response to the value of feedback voltage, $V_f$, such that $\tau_c$ is substantially equal to the DGD, $\tau_f$, in fiber 20, thereby resulting in a $\tau_{total}$ of zero. At that point, $V_f$ would be at a maximum value. Thus, if the orientation and amount of differential time delay generated by polarization transformer 30 and variable differential time delay line 50 are adjusted in the foregoing manner, then the level of distortion in the optical signal that PMD compensator 25 outputs is minimal. Moreover, if either the orientation or the level of DGD in compensator 25 deviates appreciably from the desired values (i.e., $2\theta=\pm\pi$ and $\tau_c=\tau_f$), then the signal that compensator 25 outputs will be distorted due to the resulting non-zero differential time delay, $\tau_{total}$.

It is well-known that the differential time delay, $\tau_{total}$, between two orthogonal polarization components in an optical signal modulated with a high-speed information signal may cause, within an electrical frequency band centered around a frequency of $f=\frac{1}{2}\tau_{total}$, a partial or complete fading in the detected electrical signal at the receiver. It was specifically determined that after it has been detected by an optical photodetector, the frequency response of an amplitude-modulated optical signal that has experienced differential time delay $\tau_{total}$ in an optical transmission line may be described as follows:

$$S(f) = \sqrt{1 - 4\gamma(1-\gamma)\sin^2(\pi\tau_{total}f)}$$

where f is the detected electrical frequency, $\gamma$ and $(1-\gamma)$ are the fractions of the optical power transmitted in the fast and slow PSP of the fiber, and the function S describes a reduction in the photocurrent generated by photodetector 55, with $0 \leq S \leq 1$. Note that S(f) is equal to 1 if the optical signal experiences no PMD in the transmission line (i.e., if $\tau_{total}=0$) and that S(f) reduces to zero at $f=(2\tau_{total})^{-1}$ if $\gamma=0.5$, i.e., if $\tau_{total}\neq 0$ and the optical signal has the same power level in each PSP. S(f) is thus a unique measure of the distortion in the optical signal due to the total DGD in the transmission fiber and the compensator.

If the DGD is limited to values below a maximum value, $\tau_{max}$, then the distortion in the optical signal may be quantified by simply measuring the amplitude of the received electrical signal of a particular frequency $f \leq 1/(2\tau_{max})$. The amplitude of this signal may then be used as a feedback signal to automatically adjust the orientation and level of DGD that is generated in PMD compensator 25, such that the feedback signal is maximized.

The above requirement set for the total DGD that may be inserted in a transmission system, $\tau_{total} \leq \tau_{max}$, may limit the amount of DGD that may be compensated for in an optical transmission fiber, $\tau_f$, as $\tau_{total} \leq 2\tau_f$. For example, if in a 10 Gbps digital transmission system, the amplitude of the received electrical signal is measured at 5 GHz, then $\tau_f$ should always be smaller that 50 ps. Otherwise, the feedback signal that is generated as a function of the amplitude of the 5 GHz component may be ambiguous in the sense that it is difficult to determine by which amount and direction the polarization transformation, $\underline{W}^{-1}$, and the differential time delay, $\tau_c$, need to adjusted to obtain a $\tau_{total}=0$, which may occur, for example, when the amplitude of the feedback signal is the same for two different values of $\tau_{total}$, which may result in generating faulty adjustments in the orientation and level of the differential time delay in PMD compensator 25.

Figure 2:
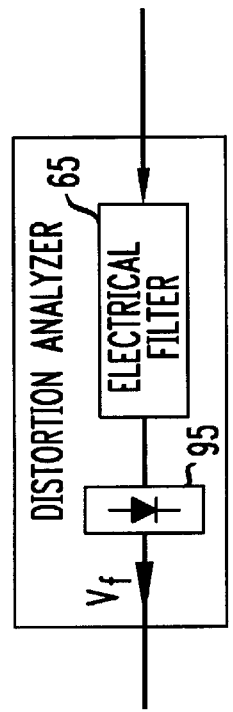
FIG. 2 is a block diagram of the distortion analyzer of FIG. 1.

We have recognized, however, that an "unambiguous" feedback signal (i.e., a signal that is a unique measure of $\tau_{total}$) may be generated, without limiting the level of compensation that may be applied to DGD, by measuring the amplitude of a plurality of frequency components contained in the optical information signal propagating through an optical fiber. An illustrative embodiment of an inventive compensator which analyzes the amplitudes of substantially the entire received frequency spectrum using a broadband electrical power detector is shown in FIG. 2. The broadband electrical power detector 95, which may be, for example, model 8474 diode detector available from the Hewlett Packard Co., more particularly, converts such amplitudes into a single feedback voltage, $V_f$, that is proportional to the integral of the amplitudes (power levels) of substantially the entire high-frequency electrical spectrum. (It is noted that it is not necessary to include the DC component of the photocurrent in the generation of the feedback voltage, since this component is usually not affected by first order PMD.)

For the illustrative embodiment of FIG. 2, the feedback voltage, $V_f$, generated by the distortion analyzer 70 (FIGS. 1 and 2) may be expressed as follows:

$$v_f = \text{const.} \cdot \int_{f_{\min}}^{f_{\max}} i_a^2(f) df \qquad (9)$$

where $i_a(f)$ is the amplified version of the photocurrent that photodetector 55 supplies to amplifier 60, $f_{min}$ and $f_{max}$ are respectively the lowest and highest frequencies of the above-mentioned spectrum, in which, preferably, $f_{min} < f_{clock}/100$, where $f_{clock}$ is the clock frequency of the received digital information, and $f_{max} > f_{clock}$. For example, to compensate for a DGD of up to 120 ps in a 10 Gbps transmission system, we found that a $f_{min}$ of $\approx 100$ MHz and a $f_{max}$ of $\approx 15$ GHz to be sufficient for deriving a feedback voltage, $V_f$, having a unique value. To obtain an "unambiguous" feedback signal, it may be necessary to either filter or apply a weighting scheme to the electrical spectrum possibly before or during the aforementioned integration process, based on the spectral components contained in the digital information signal modulated onto the optical signal. In that instance, the output of amplifier 60 is passed through electrical filter 65 before it is detected by power detector 95. This is graphically illustrated in FIG. 3 which shows a graph of the feedback voltage that is obtained by integrating the entire high-frequency spectrum of both unfiltered and filtered 10 Gbps digital information signals, carrying a random or pseudo-random bit sequence (PRBS), versus the total DGD, $\tau_{total}$, experienced by a respective optical signal. Curve 310 shows that the feedback signal derived from an unfiltered optical signal carrying PRBS exhibits secondary maxima at values of $\tau_{total}$ above about 180 ps, besides the desired absolute maximum at $\tau_{total}=0$.

Figure 3:
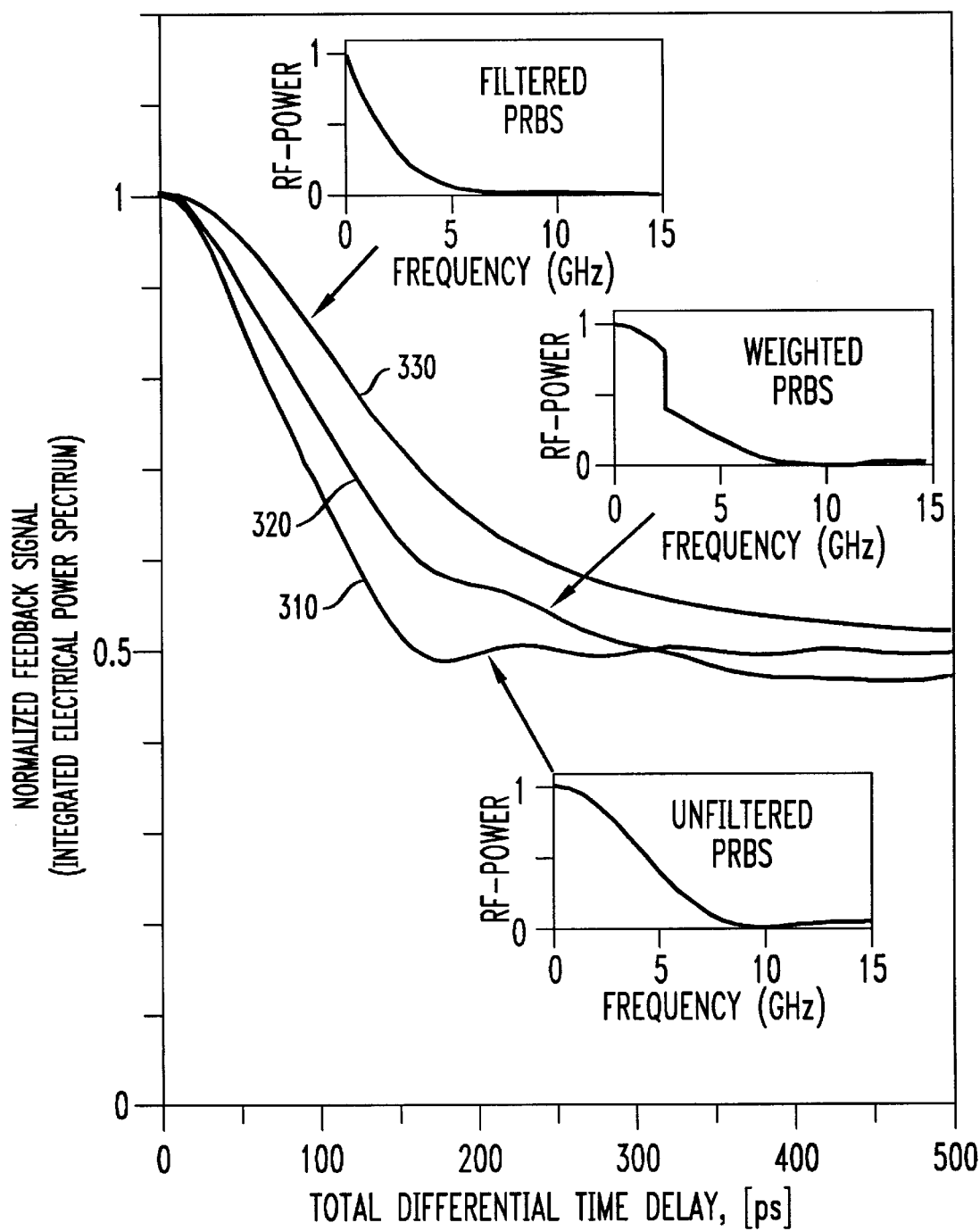
FIG. 3 illustrates in graphical form a simulation of the feedback signal versus the total differential group delay for filtered, unfiltered and weighted 10 Gb/s pseudo-random sequences.

Curve 330 of FIG. 3 also shows that appropriate filtering, or weighting, represented by curve 320, of such frequency components removes the undesired secondary maxima and, thus, provides an "unambiguous" feedback signal that may be supplied to polarization transformer 30 and adjustable delay line 50 to provide the desired level of differential time delay in the desired polarization components of the received optical signal. The polarization angle, θ, in polarization transformer 30 and differential time delay, $\tau_c$, in delay line 50 may be adjusted alternately until the level of the feedback signal, $V_f$, reaches a maximum using a simple maximum search algorithm, such as the algorithm disclosed in the aforementioned U.S. Pat. No. 5,212,743. More specifically, the differential time delay in the delay line is continuously dithered around its current value to determine the absolute maximum value of the feedback voltage, $V_f$. Each time $\tau_c$ is set to a different value, the polarization angle, θ, is adjusted by the polarization transformer until the level of the feedback signal, $V_f$, supplied by distortion analyzer 70 reaches a maximum for that setting. This procedure is repeated for each value of differential time delay, $\tau_c$, until $V_f$ reaches an absolute maximum value, where the distortion due to first-order PMD in the received optical signal is minimized.

Figure 8:
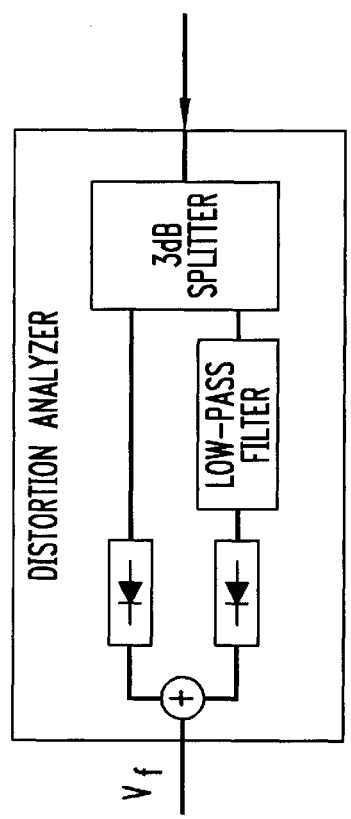
FIG. 8 illustrates a distortion analyzer that may be used to derive a feedback signal for the inventive PMD compensators in FIGS. 1 and 4.

(Note that FIG. 8 illustrates a distortion analyzer that may be used to derive an "unambiguous" signal corresponding to curve 320.)

Figure 4:
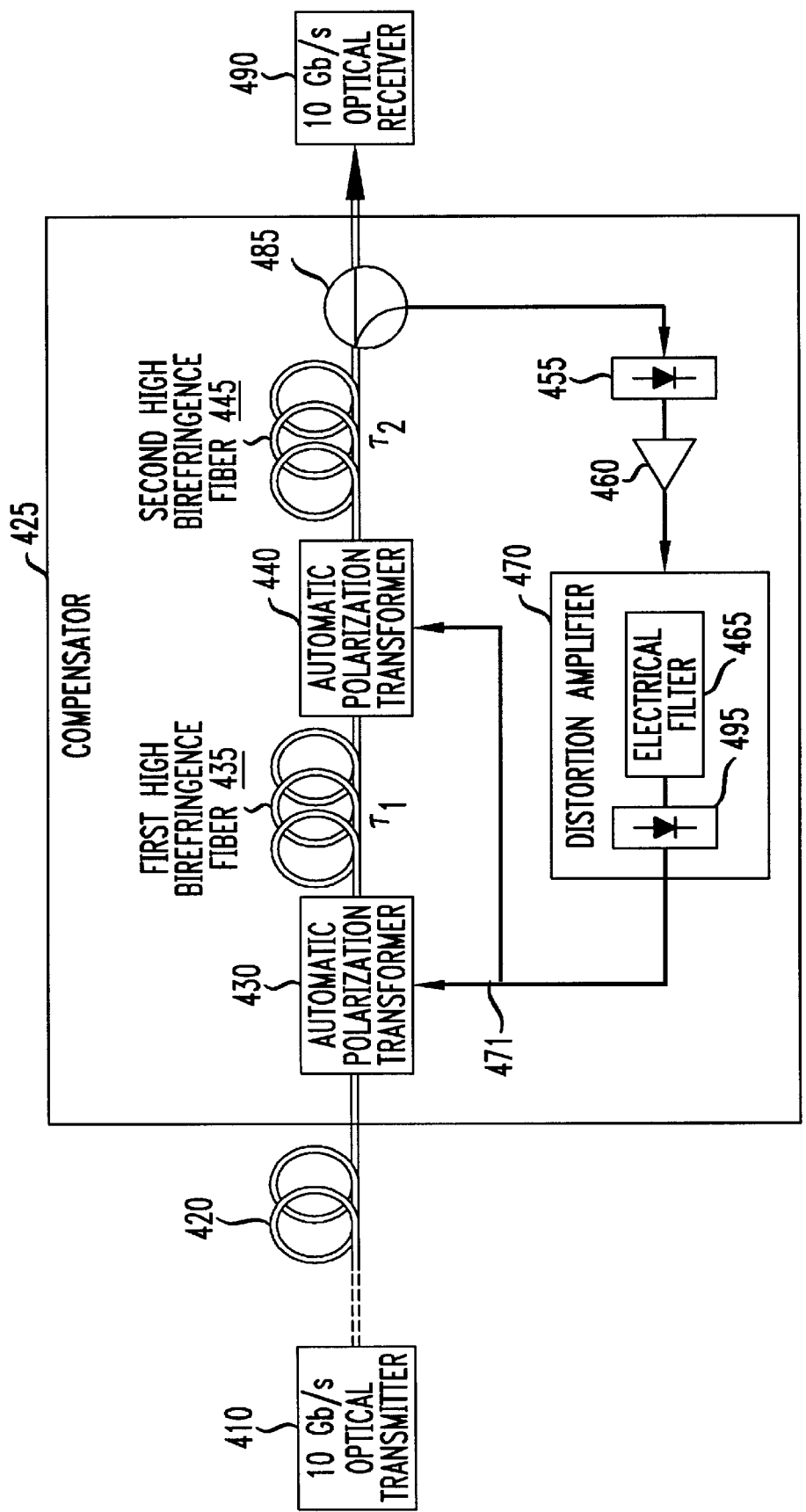
FIG. 4 illustrates in block diagram form another illustrative system in which the principles of the invention may be practiced.

A second illustrative embodiment of our invention is shown in FIG. 4, and includes a source of optical signals 410, optical transmission fiber 420, and variable DGD compensator 425 formed from two sections each respectively comprising first and second automatic polarization transformer 430 and 440 and first and second high birefringence, single-mode (HBF) fiber 435 and 445 as shown. Fiber 435 (445) may be, for example, the SM.15-P-8/125 fiber having a DGD of about 1.4 ps/m and available from the Fujikura Company (Japan). The sections generate a differential time delay of $\tau_1$ and $\tau_2$, respectively, between the light signals polarized along the slow and fast optical axes of the respective section. The output HBF 445 is coupled to an optional tap 485 connected to optical receiver 490. A portion of the optical signal is fed via tap 485 to high speed photodetector 455. Similarly, the electrical output of photodetector 455 is supplied to amplifier 460 and the amplified result is then supplied to distortion analyzer 470 comprising electrical filter 465 and broadband electrical power detector 495, which generates a feedback signal that is supplied to polarization transformer 430 and polarization transformer 440.

Polarization transformer 440 in response to the feedback signal rotates the state of polarization of the optical signal between HBF 435 and HBF 445 such that transformer 440 effectively varies the angle, $\theta_c$, between the fast axis of HBF 435 and the fast axis of HBF 445. The resulting differential time delay, $\tau_c$, provided by the cascading of HBF 435 and 445 may be described by the following expression:

$$\tau_c = \sqrt{\tau_1^2 + \tau_2^2 + 2\tau_1\tau_2\cos(2\theta_2)} \qquad (10)$$

which shows that the differential time delay generated by compensator 425 is continuously variable between a minimal value of $|\tau_1 - \tau_2|$ and a maximal value of $(\tau_1 + \tau_2)$.

Figure 5:
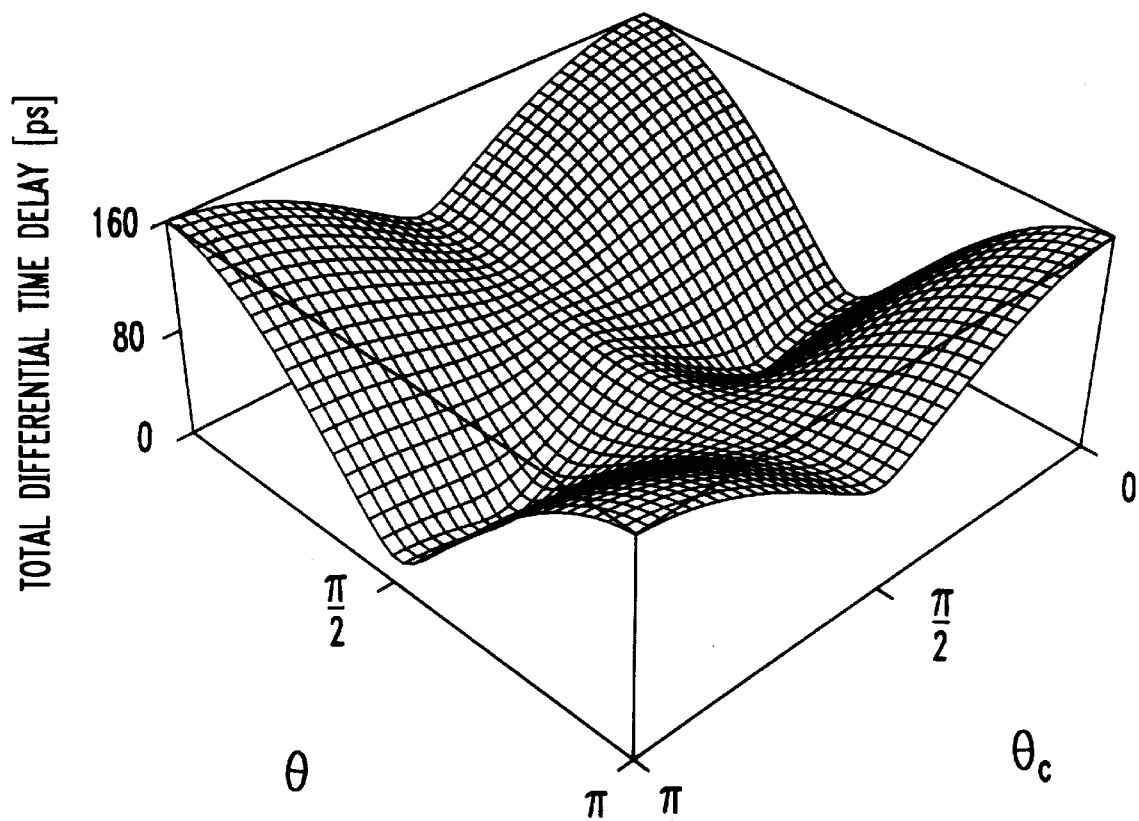
FIG. 5 illustrates in graphical form a plot of the total differential group delay against the polarization transformation angle associated with a polarization transformer of FIG. 4.
Figure 6:
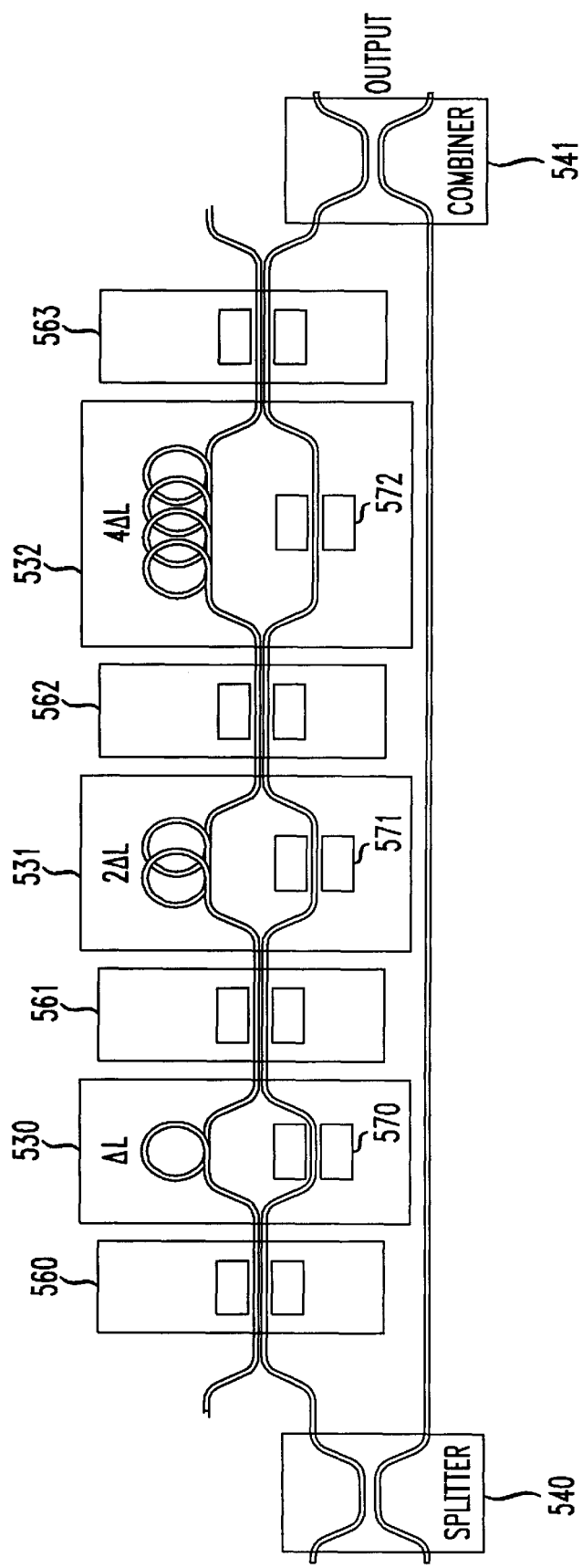
FIG. 6 is a block diagram of an illustrative embodiment of an integrated circuit version of the differential delay line of FIG. 1.

Note that by choosing $\tau_2$ of HBF 445 to be substantially equal to $\tau_1$ of HBF 435, the differential time delay $\tau_c$ may be varied between 0 and $2\tau_1$ by varying the polarization transformation in polarization transformer 440. Also note that polarization transformer 430 operates similar to polarization transformer 30 of FIG. 1, since it is used to align the output PSP of the transmission fiber parallel to the input PSP of the variable birefringence compensator formed by HBF 435, polarization transformer 440 and HBF 445 by varying the value of θ in polarization transformer 430 such that the feedback signal reaches a maximum. Transformer 440 then adjusts the value of $\theta_c$ until $\tau_c = \tau_f$. An example of that type of an adjustment is shown in FIG. 5 in which the total DGD, $\tau_{total}$, is plotted against θ and $\theta_c$. The adjustment assumes that the fiber DGD is $\tau_f = 70$ ps, and that the differential delay in the HBF 435 and HBF 445 are respectively $\tau_1 = 50$ ps and $\tau_2 = 40$ ps. It is seen from FIG. 5 that $\tau_{total}$ is approximately zero when the value of θ is π/2 radians (which means that the slow PSP of transmission fiber 420 is aligned parallel to the fast PSP of compensator 425) and when the value $\theta_c$ is approximately 0.68 radians (alternatively 2.46 radians).

The system of FIG. 4 also automatically adapts the level of compensation that it generates to a first-order PMD if polarization transformers 430 and 440 are controlled by a feedback signal that varies proportional to the level of distortion in the optical signal that compensator 425 outputs to tap 485.

As described above, the feedback paths respectively shown in FIGS. 1 and 4 include similar elements. However, the possible range of differential time delay that the system of FIG. 4 can compensate is limited by the total bandwidth of the optical signal, i.e., the high-speed information signal that is modulated onto the optical signal. Specifically, for the case where $\tau_2 = \tau_1$, the frequency-dependent polarization transformation in compensator 425 may be described by the following unitary matrix:

$$U_{comp}(\omega) = \begin{pmatrix} \cos\left(\frac{\theta_c}{2}\right), & -\sin\left(\frac{\theta_c}{2}\right) \\ \sin\left(\frac{\theta_c}{2}\right), & \cos\left(\frac{\theta_c}{2}\right) \end{pmatrix} \times$$

$$\begin{pmatrix} j[1 - j\cos\theta_c \cdot \sin(\tau_1 \Delta\omega)] + j\cos^2\theta_c \sin^2\left(\frac{\tau_1 \Delta\omega}{2}\right), & +j\sin(2\theta_c)\sin^2\left(\frac{\tau_1 \Delta\omega}{2}\right) \\ j\sin(2\theta_c)\sin^2\left(\frac{\tau_1 \Delta\omega}{2}\right) & -j[1 + j\cos\theta_c \cdot \sin(\tau_1 \Delta\omega)] - j\cos^2\theta_c \sin^2\left(\frac{\tau_1 \Delta\omega}{2}\right) \end{pmatrix} \times \begin{pmatrix} \cos\left(\frac{\theta_c}{2}\right), & \sin\left(\frac{\theta_c}{2}\right) \\ -\sin\left(\frac{\theta_c}{2}\right), & \cos\left(\frac{\theta_c}{2}\right) \end{pmatrix} \times \underline{W}(\theta)$$

(11)

where $\Delta\omega = \omega - \omega_0$, and $\underline{W}(\theta)$ is the polarization tranformation in polarization transformer 430. It is seen from equation (11) that for $\tau_c = 2\tau_1 \cdot \cos\theta_c$ and to a first order in $\Delta\omega$, $U_{comp}(\omega)$ has the same desired form of Eq. (7). However, the off diagonal terms in the second matrix on the right side of Eq. (11) show that for large values of $\tau_1 \Delta\omega$, a significant amount of light is cross coupled between the PSP of the compensator. Specifically, at $\theta_c = \pi/4$ radians and $\tau_1 \Delta\omega = \pi$ radians, the light from either one of the input PSP is completely coupled to the orthogonal output PSP.

Thus, if the total bandwidth of the optical signal is large compared with either $1/\tau_1$ or $1/\tau_2$, then compensator 425 would not be capable of simultaneously generating the desired differential time delay for all frequency components of the optical signal to offset the effects of first-order PMD in the transmission fiber.

However, we have shown experimentally that for an amplitude-modulated optical signal carrying a pseudorandom 10 Gbps digital signal, a differential time delay of $\tau_1 \approx \tau_2 \approx 50$ ps generated by compensator 425 still allowed for an adaptive PMD compensation with acceptable low levels of second-order PMD distortion.

Note that compensator 425 may be readily arranged to generate a differential time delay greater than $\tau_c = \tau_1 + \tau_2 = 100$ ps by merely adding additional sections, as needed, in which, as mentioned above, each such additional section comprises a polarization transformer and HBF with differential time delays of $\tau_3 = 50$ ps, $\tau_4 = 50$ ps, and so on. Such a compensator is also capable of compensating for the effects of second-order PMD in addition to first-order DGD.

A broad block diagram of another illustrative embodiment of an adjustable differential delay line operative for compensating for variable first-order PMD is shown in FIG. 5. Similarly, as shown in FIG. 1, the compensator system of FIG. 5 includes an element 540 at the input to split (separate) the polarization of an incoming optical signal and an element 541 at the output to recombine the transformed PSP of the transmission fiber. A variable time delay associated with one of the PSP is generated by a number of asymmetric, waveguide Mach-Zehnder interferometers 530 through 532 connected in series via adjustable directional couplers 560 through 563, respectively. The directional couplers may be controlled in a conventional manner to direct the optical signal either through the short or long leg of the Mach-Zehnder interferometers 530 through 532, thereby introducing a variable delay between 0 (zero) and $\tau_i = \Delta L_i \cdot n/c$; where $\Delta L_i \cdot n$ is the optical path difference in the i-th interferometer and c is the speed of light. It is thus possible to generate any desired differential time delay between 0 (zero) and $\tau_{cmax} = (2^n - 1) \Delta L_i n/c$ in discrete steps of $\Delta \tau_c = \Delta L_i n/c$.

To obtain an uninterrupted flow of the signal through the interferometers while the delay $\tau_c$ is being changed from one value to another, the relative optical phases in each of the interferometers need to be changed for constructive in-phase interference of the two optical signals which emerge from the two arms of each Mach-Zehnder interferometer and then enter the succeeding directional coupler. Therefore, it may be necessary to include a variable phase shifter, e.g., a respective one of the phase shifters 570 through 572, in each of the Mach-Zehnder interferometer.

A controllable waveguide delay line based on the foregoing principles may be readily constructed on a number of different electrooptic substrates, such as, for example, lithium niobate and semiconductor materials as well as other optical materials using, for example, thermo-optic or acousto-optic effects to control the directional couplers 560 through 563 and phase shifters 570 through 572.

It is noted that, for the PMD compensators shown in FIGS. 1 and 4, a very low level of distortion might occur in the signal that the transmission fiber outputs if most of the signal that is transmitted in one of the PSP of the fiber, i.e., if γ or (1-γ) is small. Also S(f) would be close to 1, even if a large value of $\tau_f$ is present in the transmission fiber. In that event, $\tau_c$ in the compensator would have some arbitrary value. Further, the level of distortion in the optical signal might become suddenly large if the state of polarization of the optical signal changes rapidly at some point along the fiber, thereby requiring rapid adjustment of the values of θ and $\tau_c$ in the PMD compensator.

The sudden adjustment of $\tau_c$ may be avoided by rapidly scanning the input state of polarization to the transmission fiber over a large number of different polarization states, such that, for example, averaged over time, all possible polarization states are excited with equal probability. Then, approximately one-half on the input signal, on average, would be in one of the PSP of the transmission fiber and the other one-half would in the other PSP, i.e., on average $\overline{\gamma}=0.5=1-\overline{\gamma}$. Consequently, a sufficient level of distortion is consistently present in the optical signal supplied to the PMD compensator to ensure that $\tau_c$ is adjusted properly independent of changes in polarization in the corresponding fiber.

To ensure that the feedback circuit in the PMD compensator remains stable, the aforementioned scanning of the input polarization state to the transmission fiber has to be performed much faster than the response time of the polarization transformer that serves as the input to the PMD compensator. One example capable of performing such scanning is the electro-optic polarization scrambler disclosed in U.S. Pat. No. 5,359,678 issued Oct. 25, 1994 to F. Heismann et al, which is hereby incorporated by reference.

Figure 7:
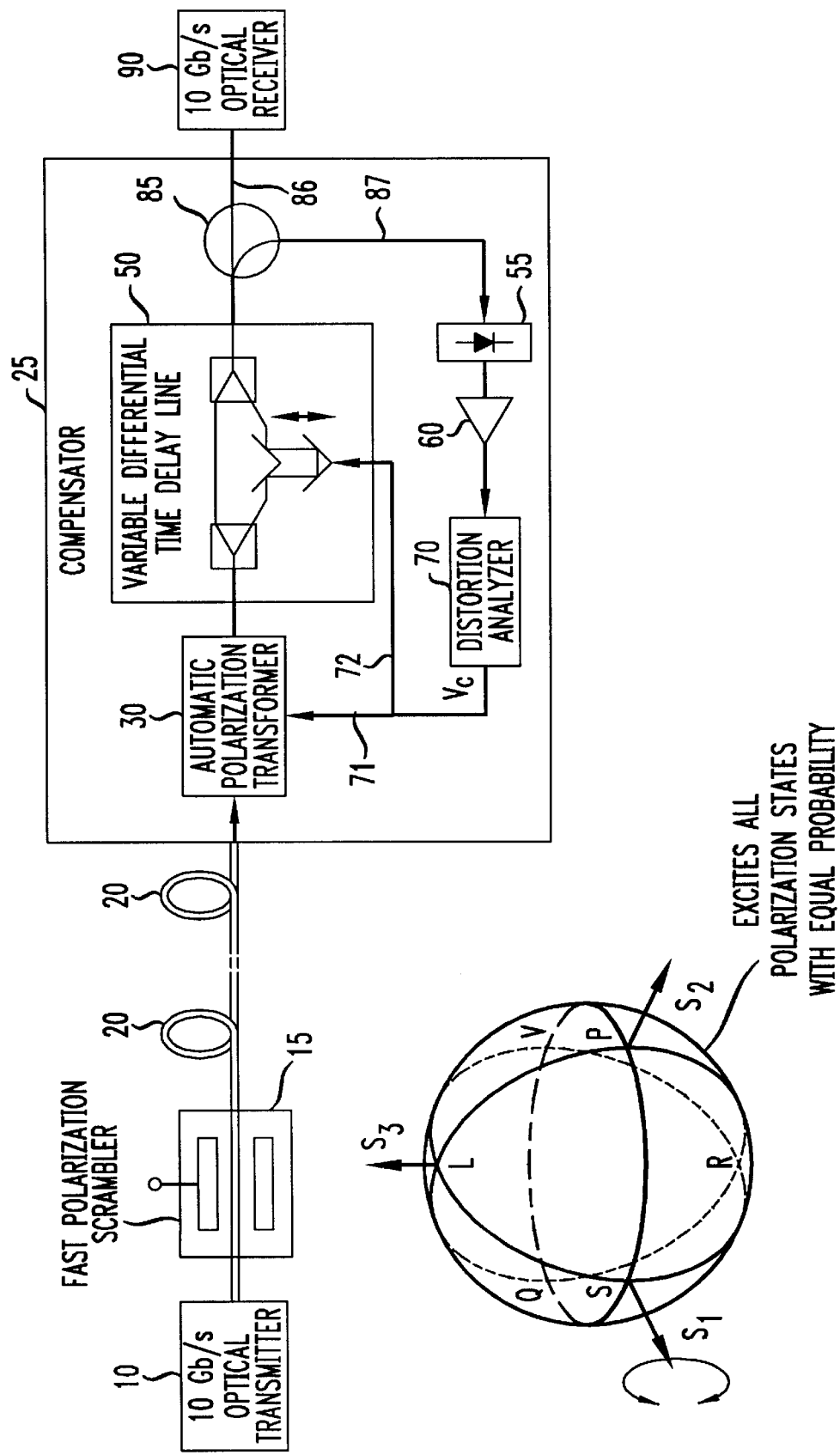
FIG. 7 is alternative embodiment of the system of FIG. 1 in which a signal scrambler is employed at the transmitter of an optical signal.

FIG. 7 shows an illustrative embodiment of the invention that uses a fast-electro-optic polarization scrambler 15 at the input of the transmission fiber. Scrambler 15 may be modulated with an arbitrary voltage, e.g., a sinusoidal or sawtooth voltage, as long as the average degree of polarization of the light signal that scrambler 15 outputs is substantially equal to zero.

The foregoing is merely illustrative of the principles of the invention. Those skilled in the art will be able to devise numerous arrangements, which, although not explicitly shown or described herein, nevertheless embody those principles that are within the spirit and scope of the invention. For example, based on the foregoing, it would be obvious to the skilled practitioner that the effects of still higher-orders of PMD may be dealt with by merely expanding the compensator, e.g., compensator 450, to include additional sections, as needed.

We claim:

1. A compensator for compensating for the effects of polarization mode dispersion occurring in an optical transmission fiber having principal states of polarization, the compensator comprising a polarization transformation element operative for reorienting the polarization of particular components of an optical signal received over the optical transmission fiber, apparatus operative for dividing a signal supplied at an output of the polarization transformation element into a predetermined number of signals each having a polarization state oriented orthogonally to a respective one of the two principal states of polarization and for delaying each such divided signal a variable amount of time; and an analyzer operative for analyzing a signal outputted by the apparatus for delaying and generating a distortion indicator having a level indicative of a level of distortion in the analyzed signal and supplying the distortion indicator to the polarization transformation element and said apparatus, and wherein said polarization transformation element and said apparatus, responsive to a change in the level of the distortion indicator respectively changing, until the level of the distortion indicator reaches a predetermined state, the orientation of each said polarization state and said variable amount of time.

2. The compensator of claim 1 wherein said polarization transformation element is a polarization transformer operative for transforming two selected orthogonal polarization components of the received optical signal into two predetermined orthogonal polarization states.

3. The compensator of claim 1 wherein said apparatus is a birefringence element that is connected to the output of the polarization transformer and generates, as a function of the value of the distortion indicator, a differential time delay between the two orthogonal polarization states.

4. The compensator of claim 1 wherein said apparatus for delaying is a differential time delay line.

5. The compensator of claim 1 wherein said polarization transformation element and said apparatus for dividing are in series with one another.

6. The compensator of claim 1 wherein said distortion analyzer comprises an optical receiver in series with first and second parallel sections in which the first parallel section comprises a broadband electrical power detector, said first parallel section comprises a low-pass filter in series with a broadband electrical power detector, and said distortion analyzer further comprises an adder circuit for combining the outputs of the first and second sections and outputting the combined signal as the distortion indicator.

7. The compensator of claim 1 wherein said distortion indicator is a feedback voltage.

8. The compensator of claim 1 wherein said polarization transformation element and said apparatus are formed from a plurality of sections each comprising a polarization transformer in series with high birefringence optical fiber in which the high birefringence fiber is connected to the output of the polarization transformer.

9. The compensator of claim 1 wherein said apparatus comprises a series of Mach-Zehnder interferometers coupled in series with one another via directional couplers.

10. The compensator of claim 9 wherein said interferometers are asymmetric waveguide interferometers.

11. Apparatus for adapting to first-order polarization mode dispersion in an optical transmission line carrying an optical signal modulated with an information signal comprising a variable optical birefringence element connected in series with the transmission line for generating a differential optical time delay between selectable mutually orthogonal polarization states, an optical signal analyzer coupled to an output of the variable birefringence element for generating a control signal proportional to the total differential optical time delay in an optical signal at the output of the variable birefringence element, and a feedback element for controlling the amount of differential time delay generated in the variable birefringence element and for selecting the two orthogonal polarization states in the variable birefringence element in response to the control signal generated by the optical signal analyzer.

12. The apparatus of claim 11 wherein the variable birefringence element comprises a variable polarization transformer for transforming two selected orthogonal polarization components of the optical signal entering the polarization transformer into two predetermined orthogonal polarization states, and a variable birefringence element connected to the output of the polarization transformer for generating a variable differential time delay between said two predetermined polarization states.

13. The apparatus of claim 12 wherein the variable birefringence element comprises
- a polarization splitter connected to the output of the polarization transformer for separating the two predetermined polarization components into two spatially separated optical paths,
- a variable differential delay line connected to the outputs of the polarization splitter for generating a variable differential time delay between the two predetermined polarization components, and
- a polarization combiner connected to the outputs of the variable differential delay line for combining said predetermined differentially delayed polarization components into two mutually orthogonal polarization states of a single optical output signal.

14. The apparatus of claim 11 wherein the variable birefringence element comprises
- a first variable polarization transformer for transforming two selected orthogonal polarization components of the optical signal entering the polarization transformer into two controllably variable orthogonal polarization states,
- a first fixed birefringence element connected to the output of the first polarization transformer for generating a first predetermined differential time delay between two predetermined orthogonal polarization components,
- a second variable polarization transformer connected to the output of the first fixed birefringence element for transforming two selected polarization components of the optical signal entering the second polarization transformer into two controllably variable orthogonal polarization states, and
- a second fixed birefringence element connected to the output of the second polarization transformer for generating a second predetermined differential time delay between two predetermined orthogonal polarization states.

15. The apparatus of claim 14 wherein the first and second differential time delay in the first and second fixed birefringence elements are substantially equal.

16. The apparatus of claim 14 wherein the first and second fixed birefringence elements are respective predetermined lengths of birefringent optical fiber.

17. The apparatus of claim 11 wherein the variable birefringence element comprises N sections connected in series, where N>1, each said section comprising:
- a variable polarization transformer for transforming two selected orthogonal polarization components of the optical signal entering the polarization transformer into two controllably variable orthogonal polarization states, and
- a fixed birefringence element connected to the output of the polarization transformer for generating a predetermined differential time delay between two predetermined orthogonal polarization states.

18. The apparatus of claim 17 wherein the predetermined differential time delays generated in the fixed birefringence elements of each section are substantially equal to each other.

19. The apparatus of claim 3 wherein the variable differential delay line comprises N sections, in which N>1, each said section comprising:
- a variable optical coupler having two inputs and two outputs for controllably directing an optical signal entering one of the inputs of the coupler to one of the outputs of the coupler, and
- a fixed differential delay line having two inputs connected to the outputs of the variable optical coupler and two outputs for generating a predetermined differential time delay between two optical signals respectively entering the delay line via the two inputs.

20. The apparatus of claim 19 wherein the differential time delays generated in the fixed differential delay lines of each section are substantially equal.

21. The apparatus of claim 19 wherein the differential time delays generated in the fixed differential delay lines are such that their values are substantially related to one another as a function of ratios of $2^{(n-1)}$, in which n is an integer between 1 and N.

22. The apparatus of claim 11 wherein the optical analyzer comprises
- a high speed photodetector for converting the information signal modulated onto the optical carrier into an electrical signal, and
- an electrical signal analyzer coupled to the output of the photodetector for measuring the distortion in the electrical signal due to differential optical time delay between two orthogonally polarized components of the optical signal and for generating a control signal proportional to the differential time delay.

23. The apparatus of claim 22 wherein the electrical signal analyzer measures the intensity of various predetermined frequency components in the electrical signal, and wherein the control signal is generated by summing the intensities of the measured electrical frequency components with predetermined weights.

24. The apparatus of claim 22 wherein the signal analyzer comprises
- an electrical filter for selectively attenuating the frequency components of the electrical signal, and
- an electrical power detector connected to the output of the electrical filter for measuring the total optical power of the filtered electrical signal and for generating a control signal substantially equal to the total power of the filtered electrical signal.

25. The apparatus as in claim 11 wherein the state of polarization of the optical signal transmitted over the transmission line is rapidly scanned over a range of polarization states, in such a manner that in time average all polarization states are excited with equal probability.

26. An optical transmission system comprising
- an optical transmitter that transmits an optical signal to an optical receiver via an optical fiber transmission line,
- a receiver that receives the optical signal from the transmission line and generates a differential time delay between selectable mutually orthogonal polarization states of components of the received optical signal, said receiver including an analyzer operative for generating a control signal having a value proportional to the value of the differential time delay, said receiver changing the value of the differential time delay and selection of the two orthogonal polarization states as a function of the current value of the control signal and doing so until the value of the control reaches a predetermined level.

27. The system of claim 26 wherein said receiver comprises a variable birefringence element.

28. The system of claim 27 wherein the variable birefringence element comprises
- a variable polarization transformer for transforming two selected orthogonal polarization components of the optical signal entering the polarization transformer into two predetermined orthogonal polarization states, and a differential time delay line connected to the output of the polarization transformer for generating a variable differential time delay between said two predetermined polarization states.

29. The system of claim 28 wherein the variable birefringence element further comprises a polarization splitter connected to the output of the polarization transformer for separating the two predetermined polarization components into two spatially separated optical paths, in which the variable differential delay line is connected to respective outputs of the polarization splitter for generating a variable differential time delay between the two predetermined polarization components, and a polarization combiner connected to the outputs of the variable differential delay line for combining said predetermined differentially delayed polarization components into two mutually orthogonal polarization states of a single optical output signal.

30. The system of claim 27 wherein the variable birefringence element comprises a first variable polarization transformer for transforming two selected orthogonal polarization components of the optical signal entering the polarization transformer into two controllably variable orthogonal polarization states, a first fixed birefringence element connected to the output of the first polarization transformer for generating a first predetermined differential time delay between two predetermined orthogonal polarization components, a second variable polarization transformer connected to the output of the first fixed birefringence element for transforming two selected polarization components of the optical signal entering the second polarization transformer into two controllably variable orthogonal polarization states, and a second fixed birefringence element connected to the output of the second polarization transformer for generating a second predetermined differential time delay between two predetermined orthogonal polarization states.

31. The system of claim 30 wherein the first and second differential time delay in the first and second fixed birefringence elements are substantially equal.

32. The system of claim 30 wherein the first and second fixed birefringence elements are respective predetermined lengths of birefringent optical fiber.

33. The system of claim 26 wherein the variable birefringence element comprises N sections connected in series, where N>1, each said section comprising:

a variable polarization transformer for transforming two selected orthogonal polarization components of the optical signal entering the polarization transformer into two controllably variable orthogonal polarization states, and a fixed birefringence element connected to the output of the polarization transformer for generating a predetermined differential time delay between two predetermined orthogonal polarization states.

34. The system of claim 33 wherein the predetermined differential time delays generated in the fixed birefringence elements of each section are substantially equal to each other.

35. The system of claim 28 wherein the variable differential delay line comprises N sections, in which N>1, each said section comprising:

a variable optical coupler having two inputs and two outputs for controllably directing an optical signal entering one of the inputs of the coupler to one of the outputs of the coupler, and a fixed differential delay line having two inputs connected to the outputs of the variable optical coupler and two outputs for generating a predetermined differential time delay between two optical signals entering the delay line in the different inputs.

36. The system of claim 35 wherein the differential time delays generated in the fixed differential delay lines of each section are substantially equal.

37. The system of claim 35 wherein the differential time delays generated in the fixed differential delay lines are such that their values are substantially related to one another as a function of ratios of $2^{(n-1)}$, in which n is an integer between 1 and N.

38. The system of claim 26 wherein the receiver further comprises an optical analyzer and wherein the optical analyzer comprises a high speed photodetector for converting the information signal modulated onto the optical carrier into an electrical signal, and an electrical signal analyzer coupled to the output of the photodetector for measuring the distortion in the electrical signal due to differential optical time delay between two orthogonally polarized components of the optical signal and for generating a control signal proportional to the differential time delay.

39. The system of claim 38 wherein the electrical signal analyzer measures the intensity of various predetermined frequency components in the electrical signal, and wherein the control signal is generated by summing the intensities of the measured electrical frequency components with predetermined weights.

40. The system of claim 38 wherein the electrical signal analyzer comprises an electrical filter for selectively attenuating the frequency components of the electrical signal, and an electrical power detector connected to the output of the electrical filter for measuring the total optical power of the filtered electrical signal and for generating a control signal substantially equal to the total power of the filtered electrical signal.

41. The system as in claim 26 wherein the state of polarization of the optical signal transmitted over the transmission line is rapidly scanned over a range of polarization states, in such a manner that in time average all polarization states are excited with equal probability.

* * * * *